(12) United States Patent
Rabezzana et al.

(10) Patent No.: US 12,730,061 B2
(45) Date of Patent: Sep. 8, 2026

(54) VIBRATION DAMPED SENSOR DEVICE

(71) Applicant: Sensirion Connected Solutions AG, Stäfa (CH)

(72) Inventors: Luca Rabezzana, Zürich (CH); Niculin Duri Pfister, Pfäffikon (CH); Reto Clopath, Schalchen (CH); Dominik Niederberger, Meilen (CH)

(73) Assignee: Sensirion Connected Solutions AG, Stäfa (CH)

( * ) Notice: Subject to any disclaimer, the term of this patent is extended or adjusted under 35 U.S.C. 154(b) by 252 days.

(21) Appl. No.: 18/755,683

(22) Filed: Jun. 27, 2024

(65) Prior Publication Data

US 2025/0003864 A1 Jan. 2, 2025

(30) Foreign Application Priority Data

Jun. 30, 2023 (EP) .................................... 23182893

(51) Int. Cl.
*G01N 21/17* (2006.01)
*G01D 11/24* (2006.01)
*G01N 29/24* (2006.01)
*G01N 33/00* (2006.01)

(52) U.S. Cl.
CPC . *G01N 21/1702* (2013.01); *G01N 2021/1704* (2013.01)

(58) Field of Classification Search
CPC ....... G01N 21/1702; G01N 2021/1704; G01N 2201/0227; G01N 33/0009; G01N 2201/023; G01N 2291/021; G01N 2291/02872; G01N 29/2425; G01D 11/245
See application file for complete search history.

(56) References Cited

U.S. PATENT DOCUMENTS 8,156,815 B2 * 4/2012 Hunziker ............. G01D 11/245 73/706
2023/0036932 A1 * 2/2023 Rudmann ............. G01N 21/03

FOREIGN PATENT DOCUMENTS

CN 110986933 A 10/2020
DE 202022105660 U1 1/2023
EP 2717051 A2 * 4/2014 ......... G01N 33/0011

* cited by examiner

*Primary Examiner* — Laura Martin
*Assistant Examiner* — Anthony W Megna Fuentes
(74) *Attorney, Agent, or Firm* — DiPerna Law Firm, P.C.

(57) ABSTRACT

A sensor device robust against vibrations is proposed. A sensor module is encapsulated with a housing and the space in between is filled with a vibration damping material such that the sensor module is only supported by the vibration damping material. A cavity in the housing formed partly by the sensor module and sealed against liquid water but permeable to a target component of ambient air allows for a fast sensor response time.

12 Claims, 2 Drawing Sheets

VIBRATION DAMPED SENSOR DEVICE

CROSS REFERENCE TO RELATED APPLICATIONS

This application claims the priority of European patent application 23182893.0, filed Jun. 30, 2023, the disclosure of which is incorporated herein by reference in its entirety.

TECHNICAL FIELD

The invention relates to sensor devices analyzing components of ambient air that have a reduced susceptibility to vibrations.

BACKGROUND ART

For the surveillance of natural gas gathering pipelines, such as in leak detection and repair (LDAR), a method employed is to track gas concentrations such as methane in ambient outdoor air. The environmental conditions vary from very cold (−40° C.) and dry to hot (60° C.) and humid because of geographical location and season. In addition, wind speeds of 15 m/s and beyond are routinely experienced by a sensor device deployed in the field.

Wind rattling the mounting of a sensor device or vibrations of heavy machinery in the vicinity generate a high noise level making accurate determination of gas concentrations using technology sensitive to vibrations such as photoacoustics a challenge.

In DE202022105660U1 a photoacoustic gas sensor for the detection of trace amounts of methane is disclosed. The sensor is compact because it uses a non-resonant sample chamber and has a low limit of detection because of a low light modulation frequency of 1 Hz to 300 Hz and an optimized narrow cylindrical geometry of the sample chamber the major axis of which is aligned with the collimated laser source.

In CN110986933A an inertial measurement unit (IMU) is disclosed that uses expandable polystyrene foam to dampen the gyroscopes in the IMU against vibrations. Two pieces of foam completely encapsulate the IMU and are glued together and insulated from outside air by a curable adhesive.

DISCLOSURE OF THE INVENTION

It is an object of the invention to provide a gas sensor that is robust against vibrations even under harsh environmental conditions.

This object is achieved by a device according to claim 1. The sensor device for measuring a target quantity in ambient air comprises a sensor module with a first side, wherein the sensor module comprises a sensitive element. The sensor device comprises a housing, wherein the housing comprises an opening, an interface for supplying power to the sensor module and an interface for exchanging data with the sensor module, and the housing surrounds the sensor module. The sensor device further comprises vibration damping material between the sensor module and the housing and a sealing attached to the first side and the opening, wherein the sealing, the first side, and the opening form a cavity. The sensor module is connected to the interfaces for supplying power and for exchanging data by one or more connecting means. The sensitive element is in fluidic communication with the cavity. Structure-borne noise is mediated from the housing to the sensor module only through the vibration damping material, the sealing, and the one or more connecting means, and the housing, the sealing, and the first side are arranged and configured such that liquid water cannot enter the vibration damping material.

In a preferred embodiment, the vibration damping material is a foam, preferably a synthetic rubber foam.

If the vibration damping material is a foamed polymer, it is preferable that the glass transition temperature of the polymer lies below the minimal expected temperature in the use case, for instance −40° C. in case of methane surveillance of natural gas gathering pipelines. Below the glass transition temperature, the elastic moduli of the polymer and thus its capability to transmit vibrations increase sharply.

In a preferred embodiment, the sealing is non-porous.

There are many porous sealing materials, such as expanded PTFE, that protect from liquid water while at the same time being permeable to water vapor or other molecules in the gas phase. In particular, a porous sealing is permeable to methane. This may negatively affect the response time of the sensor device in case the target quantity is a gaseous component of ambient air. When the sealing is porous any target gas may diffuse into the vibration damping material and get trapped there, in particular if the material is foam. When the target gas concentration outside the sensor device drops again the sensor reading would be artificially enlarged because the residual target gas is trapped in the vibration damping material and is being released on a slower timescale than the target gas outside the housing which is being transported by convection.

The sealing is ideally made of a mechanically transparent material that offers no structural support to the sensor module. A quantitative manner to express this is to use an elastic modulus such as Young's modulus. The sealing is preferably flexible in the sense that its Young's modulus is lower than 50 MPa, preferably lower than 10 MPa, more preferably lower than 1 MPa. In this manner, vibrations picked up from the housing are mainly transmitted through the foam material and thus dampened effectively. The sources of mechanical vibrations are manifold and depend on the use-case. For instance, in case of methane surveillance of natural gas gathering pipelines the housing may be mounted on a pole, and the pole may be equipped with a solar panel for generating power that is to be supplied to the sensor module. The rigid area of the solar panel interacts strongly with wind and will transmit vibrations via the pole to the housing. Another source of vibrations are machinery or vehicles in the vicinity that transmit vibrations to the pole and thus to the housing via the ground they share.

Analogously, any cables that connect the sensor module to interfaces in the housing for power supply and data exchange are preferably coiled and/or soft-mantled to minimize transmission of vibrations. This also makes it clear why sealing the vibration damping material against water ingress is essential: If any part of the vibration damping material gets soaked with liquid water and the temperature in the housing drops below zero, ice forms and may provide a rigid connection between housing and sensor module. Vibrations of the housing would then travel barely attenuated to the sensor module and potentially compromise the sensor reading.

In a preferred embodiment, the sensor module is a photoacoustic gas sensor module.

Photoacoustic gas sensors can provide an essentially offset-free concentration measurement of a variety of gases in ambient air. They can be built with a small form factor and are cost-effective. To achieve a good signal to noise ratio, an acoustically resonant design may be chosen. However, a small form factor (centimeters) would then imply a lock-in frequency of the order of kHz, putting strict requirements on the excitation light source. Alternatively, non-resonant modulation may be employed, preferably in the hundreds of Hz. However, many mechanical systems display a power spectral density of vibrations that varies inversely with frequency (pink, or 1/f noise). It is then of particular importance to shield the photoacoustic sensor module from vibrations.

In a preferred embodiment, the target quantity is methane.

In the surveillance of methane leaks of natural gas gathering pipelines a fixed position monitoring system of methane concentration sensors and anemometers may be employed. To gauge the amount of leaked methane accurately, Gaussian plume modeling may be used. The trueness of the estimated leak size and the accuracy of leak localization is directly related to the trueness of the methane concentration reading at the monitoring sites distributed in proximity to the leak. However, at natural gas processing sites vibrational noise due for instance to wind rattling or transportation trucks is paramount. It is therefore advantageous to have a sensor device that is not affected by mechanical vibrations.

BRIEF DESCRIPTION OF THE DRAWINGS

In the following a detailed description is provided that will make embodiments of the invention easier to understand. The description will reference the drawings, wherein.

DETAILED DESCRIPTION OF WAYS CARRYING OUT THE INVENTION

Figure 1:
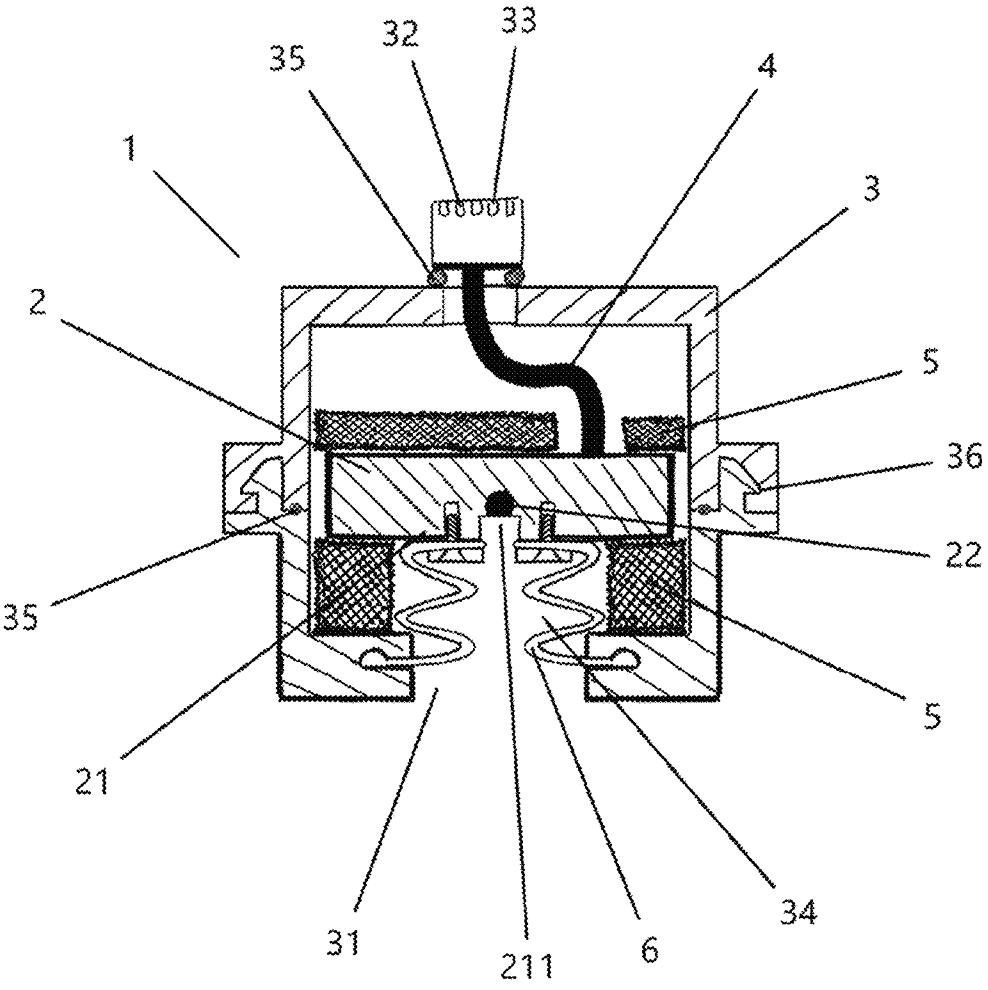
FIG. 1 shows a schematic cut view of a vibration damped sensor device according to an embodiment of the present invention.

The sensor device 1 of FIG. 1 is a gas sensor such as a photoacoustic methane sensor. The housing 3 is made of two injection-molded parts that interlock in a water-tight manner, for instance with a snap-fit joint 36 and an O-ring sealing 35. The housing 3 encapsulates a sensor module 2 and protects it from environmental stresses such as wind, water, and solar radiation. Interfaces 32 and 33 for supplying power to and facilitating communication with the sensor module 2 are attached to the housing 3, and sealings 35 protect it from ingress of water and dust. The sensor module 2 is connected to the interfaces by one or more connecting means 4 such as cables or flexible PCBs. The housing 3 has an opening 31 that allows ambient air to reach the sensor module 2 by convection, enabling the sensor module 2 to be exposed to ambient conditions with little delay. Sensor module 2 comprises a sensitive element 22 such as a microphone in acoustic communication with a chamber (not shown), and the chamber is in fluidic communication with the opening 31. The microphone picks up pressure waves generated by methane molecules absorbing modulated IR light shined into the chamber by a light source (not shown). A first side 21 of the sensor module 2 faces the opening 31. A flexible sealing 6 is attached to the first side 21 using screwed clamps. An opening 211 in the first side gives the sensitive element 22 access to the ambient air that enters the housing through the opening 31. The opening 211 is covered with a porous polymer membrane (not shown) to protect the chamber from liquid water or dust but allowing air exchange. The opening 211 is dimensioned large enough such that diffusion of methane occurs fast enough enabling sensor response times of the order of seconds to changes in methane concentrations. The flexible sealing 6 is also attached to the borders of the opening 31, for instance using a two-component injection mold. The flexible sealing 6, the first side 21 of the sensor module 2, and the opening 31 of the housing thus form a cavity 34 that allows rapid air exchange but is sealed against water ingress into the housing.

The space between the sensor module 2 and the housing 3 is at least partially filled with a vibration damping material 5 such as synthetic rubber foam, for instance ethylene propylene diene monomer (EPDM). It is essential that no rigid part of the housing is in direct contact with the sensor module 2. In that sense, the sensor module 2 is mechanically floating in the housing, held in place only by the vibration damping material 5.

Figure 2:
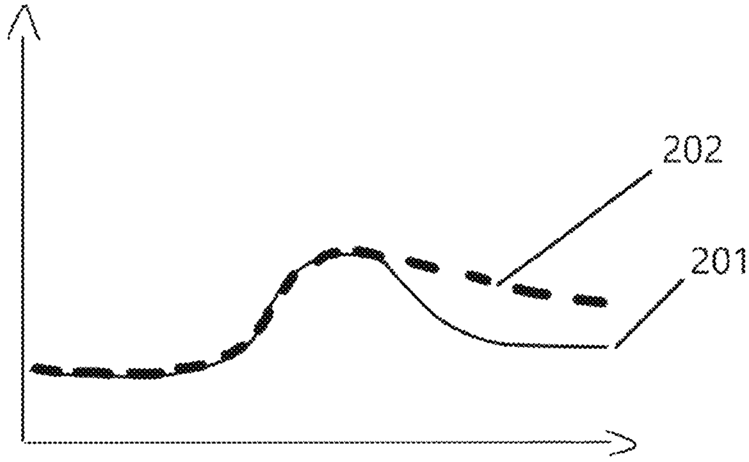
FIG. 2 shows a graph of relaxation times of two vibration damped sensor devices.

Note that sealing the housing against water and dust by simply covering the opening 31 of the housing, say by a porous membrane, leads to a much inferior product. The target gas such as methane after entering the cavity 34 will diffuse into the vibration damping material and greatly compromise the relaxation time as shown in FIG. 2. Time traces 201 and 202 of methane concentrations from two sensor devices are shown. Time trace 201 comes from a sensor device according to an embodiment of the invention where the sealing 6 is non-porous. The cavity 34 of the sensor device yielding time trace 202 on the other hand is not sealed, and methane can diffuse into the foam material 5 getting trapped in there. Clearly, the relaxation time is compromised, and an elevated methane concentration is reported long after the actual ambient methane concentration has dropped to near zero, as evidenced by the time trace 201. The cavity 34 of these two sensor devices is sealed and limits methane diffusion into the foam material 5.

LIST OF REFERENCE SIGNS

- 1 sensor device
- 2 sensor module
- 21 first side of sensor module
- 211 opening in the first side
- 22 sensitive element
- 3 housing
- 31 opening of the housing
- 32,33 interfaces
- 34 cavity
- 35 sealings
- 36 snap-in interlocking system
- 4 one or more connecting means
- 5 vibration damping material
- 6 sealing

The invention claimed is:

1. A sensor device for measuring a target quantity in ambient air comprising:

- a sensor module with a first side, wherein the sensor module comprises a sensitive element,
- a housing, wherein the housing comprises an opening, a first interface for supplying power to the sensor module and a second interface for exchanging data with the sensor module, wherein the housing surrounds the sensor module,
- vibration damping material between the sensor module and the housing,
- a sealing attached to the first side and the opening, wherein the sealing, the first side, and the opening form a cavity, wherein the sensor module is connected to the first and second interfaces for supplying power and for exchanging data by one or more connecting means, wherein the sensitive element is in fluidic communication with the cavity, wherein structure-borne noise is transmitted from the housing to the sensor module only through the vibration damping material, the sealing, and the one or more connecting means, and the housing, the sealing, and the first side are arranged and configured such that liquid water cannot enter the vibration damping material.

2. The sensor device according to claim 1, wherein the sealing is non-porous.

3. The sensor device according to claim 1, wherein the sealing has a Young's modulus lower than 50 MPa.

4. The sensor device according to claim 1, wherein the vibration damping material is a foam.

5. The sensor device according to claim 4, wherein the foam is a synthetic rubber foam.

6. The sensor device according to claim 5, wherein the glass transition temperature of the synthetic rubber foam is lower than −40° C.

7. The sensor device according to claim 1, wherein the sensor module is a photoacoustic gas sensor module.

8. The sensor device according to claim 1, wherein the housing comprises two injection-molded parts joined with a snap-in interlocking system.

9. The sensor device of claim 8, comprising an O-ring sealing between the two injection-molded parts.

10. The sensor device according to claim 1, wherein the target quantity in ambient air is methane.

11. The sensor device according to claim 1, wherein the sealing has a Young's modulus lower than 10 MPa.

12. The sensor device according to claim 1, wherein the sealing has a Young's modulus lower than 1 MPa.

* * * * *